US007615981B2

(12) United States Patent
Wong et al.

(10) Patent No.: US 7,615,981 B2
(45) Date of Patent: Nov. 10, 2009

(54) BOOST CONVERTER WITH ENHANCED CONTROL CAPABILITIES OF EMULATING AN INDUCTOR CURRENT

(75) Inventors: Foot Shen Wong, Singapore (SG); Ming Kwang Han, Singapore (SG); Vlad Mihail Popescu-Stanesti, San Jose, CA (US)

(73) Assignee: O2Micro International Limited, Grand Cayman (KY)

( * ) Notice: Subject to any disclaimer, the term of this patent is extended or adjusted under 35 U.S.C. 154(b) by 176 days.

(21) Appl. No.: 10/944,263

(22) Filed: Sep. 17, 2004

(65) Prior Publication Data
US 2005/0275392 A1 Dec. 15, 2005

Related U.S. Application Data

(60) Provisional application No. 60/578,372, filed on Jun. 9, 2004.

(51) Int. Cl.
G05F 1/565 (2006.01)
(52) U.S. Cl. .................. 323/285; 323/282; 323/299
(58) Field of Classification Search .............. 323/285, 323/222, 299, 300, 301, 303, 288
See application file for complete search history.

(56) References Cited

U.S. PATENT DOCUMENTS

| 5,898,328 | A | * | 4/1999 | Shoji | 327/157 |
|---|---|---|---|---|---|
| 5,912,552 | A | | 6/1999 | Tateishi | 323/285 |
| 5,959,443 | A | * | 9/1999 | Littlefield | 323/287 |
| 5,982,160 | A | | 11/1999 | Walters et al. | 323/282 |
| 5,994,882 | A | * | 11/1999 | Ma | 323/222 |
| 6,005,785 | A | * | 12/1999 | Kudou et al. | 363/50 |
| 6,043,715 | A | * | 3/2000 | Bailey et al. | 331/2 |
| 6,163,142 | A | | 12/2000 | Tsujimoto | 323/283 |
| 6,288,524 | B1 | | 9/2001 | Tsujimoto | 323/285 |
| 6,304,066 | B1 | * | 10/2001 | Wilcox et al. | 323/282 |
| 6,329,801 | B1 | * | 12/2001 | Zuniga et al. | 323/285 |
| 6,337,647 | B1 | * | 1/2002 | Masson et al. | 341/150 |
| RE37,609 | E | * | 3/2002 | Bittner | 323/272 |
| 6,366,070 | B1 | * | 4/2002 | Cooke et al. | 323/284 |
| 6,377,032 | B1 | * | 4/2002 | Andruzzi et al. | 323/224 |

(Continued)

FOREIGN PATENT DOCUMENTS

EP 0532263 3/1993

(Continued)

OTHER PUBLICATIONS

Switching and Linear Power Supply, Power Converter Design, Abraham Pressman, 1988, pp. 9-11.*

(Continued)

Primary Examiner—Adolf Berhane
Assistant Examiner—Harry Behm

(57) ABSTRACT

A DC to DC converter for converting an input DC voltage to an output DC voltage. The DC to DC converter may include at least one switch, an inductor coupled to the at least one switch, and a controller capable of providing a control signal. The at least one switch may be responsive to the control signal in a first state to enter an ON state for an ON time interval, the ON time interval based on the input DC voltage and a constant. An electronic device including such a DC to DC converter and related methods are also provided.

40 Claims, 16 Drawing Sheets

U.S. PATENT DOCUMENTS

| | | | |
|---|---|---|---|
| 6,445,233 B1 * | 9/2002 | Pinai et al. | 327/159 |
| 6,469,917 B1 * | 10/2002 | Ben-Yaakov | 363/44 |
| 6,476,662 B2 * | 11/2002 | Geysen | 327/403 |
| 6,486,645 B1 * | 11/2002 | Van Auken | 323/287 |
| 6,515,463 B2 * | 2/2003 | Ling | 323/315 |
| 6,710,583 B2 * | 3/2004 | Stanescu et al. | 323/280 |
| 6,717,388 B2 * | 4/2004 | Smidt et al. | 323/271 |
| 6,741,130 B2 * | 5/2004 | Wey et al. | 330/253 |
| 6,762,652 B2 * | 7/2004 | De Groot | 331/185 |
| 6,812,676 B2 | 11/2004 | Tateishi | 323/225 |
| 6,815,936 B2 * | 11/2004 | Wiktor et al. | 323/282 |
| 6,906,536 B2 * | 6/2005 | Pearce et al. | 324/713 |
| 2003/0039128 A1 | 2/2003 | Cohen | 363/20 |
| 2004/0036459 A1 | 2/2004 | Wiktor et al. | |

FOREIGN PATENT DOCUMENTS

| | | |
|---|---|---|
| JP | H07-177731 | 7/1995 |
| JP | H08-297986 | 11/1996 |
| JP | 2000-324808 | 11/2000 |
| JP | 2001-314083 | 11/2001 |
| JP | 2004-64994 | 2/2004 |
| JP | 2004-096921 | 3/2004 |
| WO | WO02/058217 | 7/2002 |
| WO | WO 2004/004104 | 1/2004 |

OTHER PUBLICATIONS

Australian Patent Office Search Report 5 Pages, Jun. 9, 2004.
Australian Patent Office Written Opinion 4 Pages, Sep. 23, 2005.

* cited by examiner

INDUCTOR CURRENT WAVEFORM UNDER DIFFERENT LOAD CONDITIONS

Vin = INPUT VOLTAGE
Vout = OUTPUT VOLTAGE
R4a = BIASING RESISTOR FOR CHARGING CURRENT SOURCE
R4b = BIASING RESISTOR FOR DISCHARING CURRENT SOURCE

BOOST CONVERTER WITH ENHANCED CONTROL CAPABILITIES OF EMULATING AN INDUCTOR CURRENT

CROSS REFERENCE TO RELATED APPLICATIONS

This application claims the benefit of the filing date of U.S. Provisional Application Ser. No. 60/578,372, filed Jun. 9, 2004, the teachings of which are incorporated herein by reference.

FIELD

This disclosure relates to DC to DC converters, and more particularly to boost DC to DC converters and controllers for such boost converters.

BACKGROUND

A DC to DC converter may be used to convert an input DC voltage to an output DC voltage. A boost converter is a type of DC to DC converter that converts an input DC voltage into a higher output DC voltage. Such boost converters may be utilized in a variety of electronic devices including portable electronic devices deriving power from a battery source. Usually, the output voltage is regulated to a required value, while the input voltage varies due to battery discharging or to variable load current. The output voltage of the boost converter may be controlled by a controller which controls a state of one or more switches.

One type of control signal provided to the switches may be a pulse width modulated (PWM) signal where the duty cycle of the PWM signal varies to control the state of the switches. In a boost converter utilizing a PWM control signal the current ripple in an associated inductor of the boost converter depends on the duty cycle (D) of the PWM control signal. The inductor current ripple is maximum for D=0.5, and decreases when the duty cycle is either D>0.5 or D<0.5. While designing such a boost converter, the worst case inductor current limit should be taken into consideration. This requires an inductor to support the peak current without saturating the core. For a boost converter controlled by a PWM control signal, the inductor has to be sized for the peak current that occurs at D=0.5, when the input voltage is $V_{IN}=V_{OUT}/2$. For any other input voltage the peak current will be smaller, thus the inductor will be under utilized. The same under utilization affects all of the boost converter components, including the power switches, and the output and input filtering capacitors meant to smooth the output voltage and filter the input voltage. All these affect negatively the cost, size, and efficiency of the boost converter. Other types of control signals, e.g., pulse frequency modulation (PFM) which varies its frequency, have similar drawbacks as the boost converter controlled by a PWM control signal.

BRIEF DESCRIPTION OF THE DRAWINGS

Features and advantages of embodiments of the claimed subject matter will become apparent as the following Detailed Description proceeds, and upon reference to the Drawings, where like numerals depict like parts, and in which:

Although the following Detailed Description will proceed with reference being made to illustrative embodiments, many alternatives, modifications, and variations thereof will be apparent to those skilled in the art. Accordingly, it is intended that the claimed subject matter be viewed broadly.

DETAILED DESCRIPTION

Figure 1A:
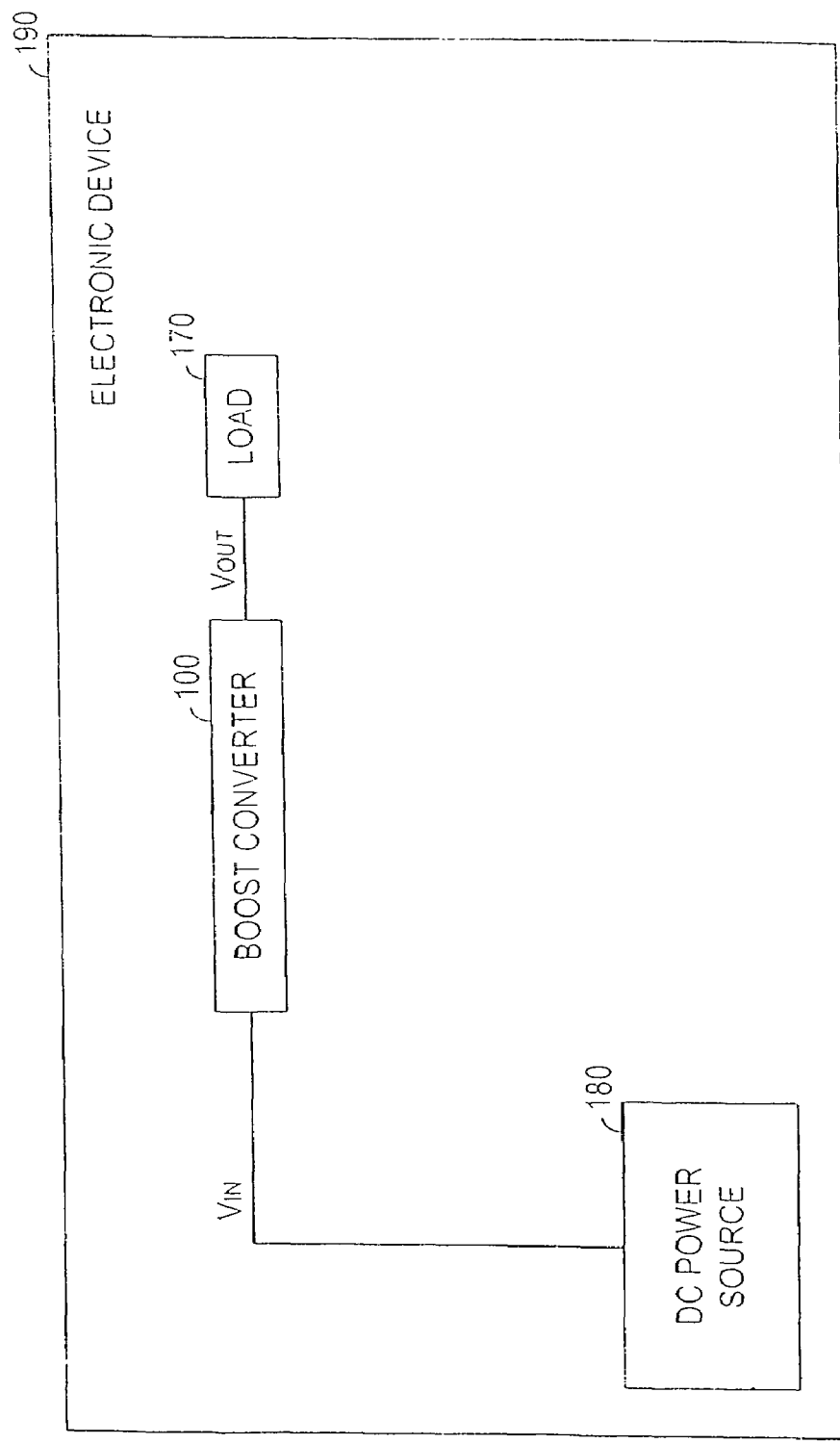
FIG. 1A is a simplified block diagram of an electronic device having a boost converter consistent with an embodiment.

FIG. 1A illustrates an electronic device 190 having a boost converter 100 consistent with an embodiment. The electronic device 190 may be any variety of electronic devices, including, but not limited to, a server computer, a desk top computer, a lap top computer, cell phone, personal digital assistant, power tool, etc. The electronic device 190 may receive power from any variety of power sources such as a DC power source 180. The DC power source may be any variety of power sources such as, for example, an AC/DC adapter, a DC "cigarette" type adapter, a battery, or a rechargeable battery. A rechargeable battery may include any type of rechargeable battery such as lithium-ion, nickel-cadmium, nickel-metal hydride batteries, or the like. The boost converter 100 may receive a DC input voltage, Vin, and provide an output DC voltage, Vout, to a load 170 that is greater than the input voltage Vin.

Figure 1B:
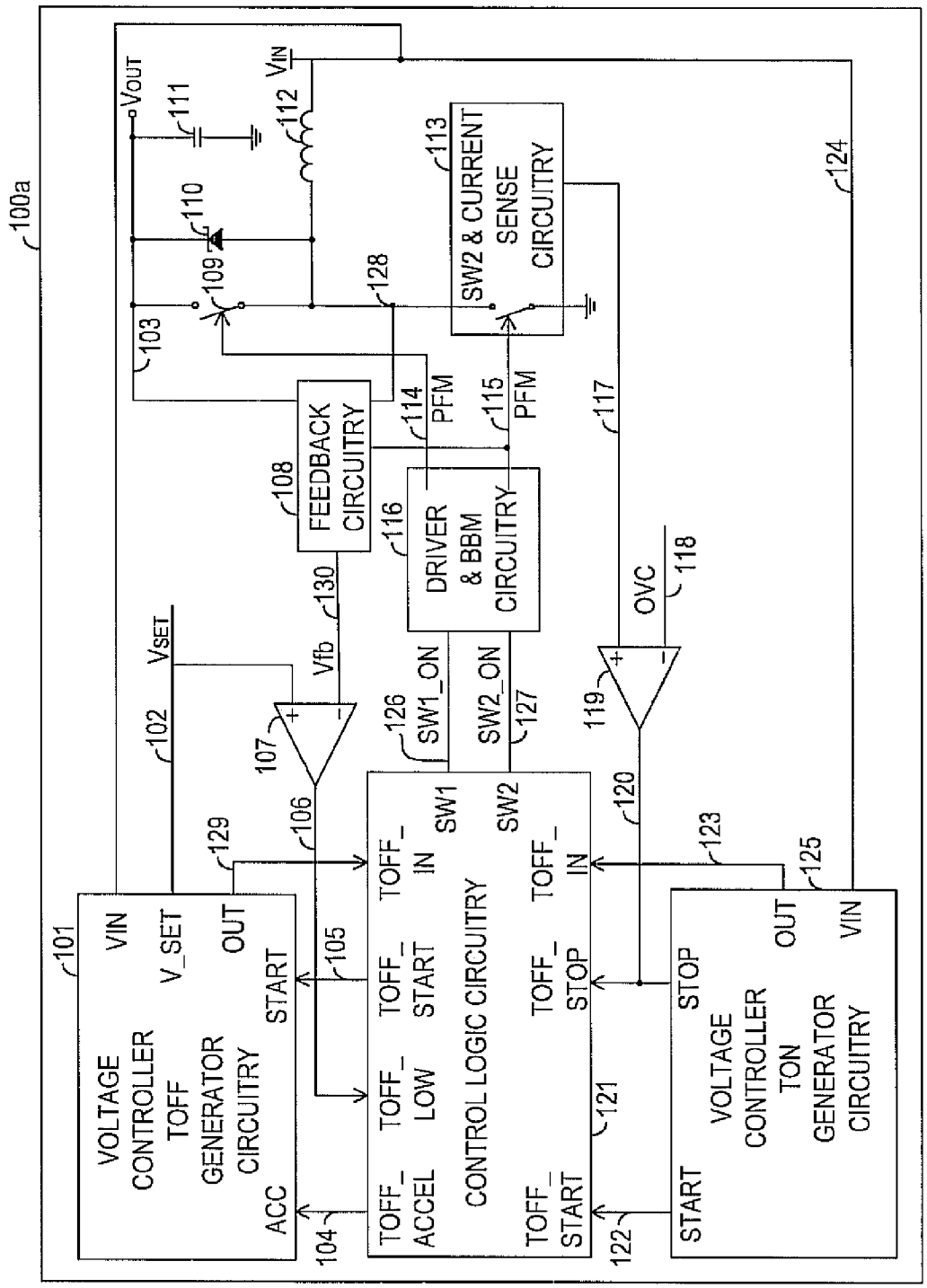
FIG. 1B is a block diagram of an embodiment of the boost converter of FIG. 1A.

FIG. 1B illustrates a block diagram of one embodiment 100a of the boost converter 100 of FIG. 1 in more detail. In general, the boost converter 100a receives an input DC voltage, $V_{IN}$, and provides a desired output DC voltage, $V_{OUT}$ greater than $V_{IN}$. The boost converter 100a may generally include an inductor 112, a main switch SW2 and current sensing circuitry 113, a synchronous switch SW1 109, a rectifying diode 110, and an output capacitor 111. The switch SW1 109 and the current sense circuitry embedded in the circuitry 113 may be omitted in some embodiments. As used herein, "circuitry" may comprise, for example, singly or in any combination, hardwired circuitry, programmable circuitry, state machine circuitry, and/or firmware that stores instructions executed by programmable circuitry.

The switch SW2 may be driven ON and OFF by the drivers & break before make (BBM) circuitry 116 via path 115, while the switch SW1 109 may be driven by the same drivers & BBM circuitry 116 via path 114. The drivers & BDM circuitry 116 may include BBM circuitry to avoid simultaneous conduction of SW1 and SW2. When the switch SW2 is driven ON, the current through the inductor 112 increases linearly with the slope $V_{IN}/L$. The amplitude of the current ramp may be proportional to the on-time of SW2. After SW2 is turned OFF, current may be delivered to the output line 103 through the diode 110 or the switch SW1 109. The feedback circuitry 108 may monitor the output voltage $V_{OUT}$ either directly from the output line 103 when the switch SW1 109 is OFF, or from the node 128 when switch SW1 is ON, and provide the comparator 107 with feedback information, e.g., voltage Vfb on path 130. This feedback information may embed an output current component beside a voltage one to assure loop stability.

The comparator 107 may compare the feedback voltage Vfb on path 130 from the feedback circuitry 108 with the set voltage $V_{SET}$ applied on path 102, and provide the control logic circuitry 121 with a $V_{OUT\_LOW}$ signal via path 106 coupled to an output of the comparator 107. The $V_{OUT\_LOW}$ signal may therefore be representative of a difference between the output voltage $V_{OUT}$ and the set voltage $V_{SET}$.

A signal representative of the input voltage $V_{IN}$ may be applied to the voltage controlled $t_{ON}$ generator circuitry 125 via path 124. The voltage controlled $t_{ON}$ generator circuitry 125 may also be referred to as an activation generator. The voltage controlled $t_{ON}$ generator circuitry 125 may output a pulse having a duration $t_{ON}$ based on the input voltage $V_{IN}$ and a constant. In particular, the $t_{ON}$ duration may be reversely proportional to the input voltage as given by equation (1) where K is the value of the constant.

$$t_{ON}=K/V_{IN} \quad (1)$$

In one embodiment, K may be $0.58*10^{-6}$. The conversion from $V_{IN}$ to $t_{ON}$ according to equation (1) may be implemented by either analog or by digital means. The $t_{ON}$ pulse may be triggered by the TON_START signal originating from the control logic circuitry 121 via path 122. Control logic circuitry 121 may generate the TON_START signal if the $V_{OUT\_LOW}$ signal, provided by the comparator 107, indicates that the feedback voltage Vfb is less than the set voltage $V_{SET}$. The $t_{ON}$ pulse may be sent to the control logic circuitry 121 via path 123. During the $t_{ON}$ pulse, the control logic circuitry 121 may assert the signal SW2_ON on path 127 to drivers & BBM circuitry 116. In response, the drivers & BBM circuitry 116 may drive switch SW2 ON. This may then cause an increase of current flowing from $V_{IN}$ through the inductor 112, node 128, and SW2. The current slope may be $V_{IN}/L$ during such a condition.

The current ripple in the inductor 112 when SW2 is ON may be therefore defined by equation (2).

$$\Delta I_L=(V_{IN}/L)\times t_{ON} \quad (2)$$

The amplitude of the current therefore increases proportionally with $t_{ON}$ and the slope of the rising current. Since $t_{ON}$ is parametrical, as defined in equation (1), equation (2) may be rewritten as detailed in equation (3) substituting in the value of $t_{ON}$ from equation (1) into equation (2).

$$\Delta I_L=(V_{IN}/L)\times(K/V_{IN})=K/L \quad (3)$$

As can be observed by equation (3), the current ripple $\Delta I_L$ is constant because K and L are constants. Advantageously, this feature allows optimal design of the boost converter 100 using in full the current capability of the inductor 112 and the switch SW2 in 113. As such, the inductor 112 and other components of the boost converter 100 do not have to be oversized as in a prior art embodiment. Hence, efficiency of the boost converter 100 may be increased. The size of the components may also be decreased to save space in an environment having a premium on such space. The cost of the components may also be less than oversized prior art components.

When $t_{ON}$ has elapsed, the control logic circuitry 121 may switch the SW2_ON signal to non-active. In response, switch SW2 may turn off. The control logic circuitry 121 may also issue the TOFF_START command on path 105 when $t_{ON}$ has elapsed. The TOFF_START command on path 105 may trigger the voltage controlled $t_{OFF}$ generator circuitry 101. The voltage controlled $t_{OFF}$ generator circuitry 101 may also be referred to as a disactivation generator. The voltage controlled $t_{OFF}$ generator circuitry 101 may output a $t_{OFF}$ pulse via path 129 to the control logic circuitry 121. During $t_{OFF}$, the control logic circuitry 121 may assert the SW1_ON signal which may then be provided to the drivers 116 via path 126. In response, the drivers 116 may drive switch SW1 119 ON.

The energy accumulated in the inductor 112 may be dissipated during the $t_{OFF}$ time interval to the output line 103, recharging the output capacitor 111 and powering the load (not shown) connected to $V_{OUT}$. To avoid simultaneous conduction of SW2 and SW1, for a very short time these two switches may be kept OFF by BBM circuitry which may be embedded in the drivers & BBM circuitry 116. The current from the inductor 112 may flow during this BBM time interval through the diode 110 to the output line 103.

If the VOUT_LOW signal on path 106 indicates that the feedback voltage Vfb is larger than the set voltage $V_{SET}$ when $t_{ON}$ elapses and the TOFF_START signal is generated, the control logic circuitry 121 may keep the TOFF_ACCEL signal inactive. In this case, the duration of the $t_{OFF}$ pulse will correspond to equation (4):

$$t_{OFF}=K/((V_{SET}*D)-V_{IN}), \text{ where D is a feedback factor=Vout/Vfb.} \quad (4)$$

In contrast, if the signal VOUT_LOW on path 106 indicates that the feedback voltage Vfb is less than the set voltage anytime after $t_{ON}$ elapses, the control logic circuitry 121 may make the TOFF_ACCEL signal active. In this case, $t_{OFF}$ will be accelerated, and will have a shorter duration than the one described by equation (4).

When $t_{OFF}$ has elapsed, control logic circuitry 121 may look to the VOUT_LOW signal. If the VOUT_LOW signal on path 106 indicates that the feedback voltage Vfb on path 130 is less than the set voltage $V_{SET}$, then the control logic circuitry 121 may immediately issue the TON_START command, initiating a new cycle. If the signal VOUT_LOW on path 106 indicates that the output voltage is greater than the set voltage $V_{SET}$, the control logic circuitry 121 may wait until VOUT_LOW changes state and then issue the TON_START command. In this way, the output voltage $V_{OUT}$ on path 103 may be regulated. This method also provides the advantage of maintaining high efficiency at low load currents by skipping pulses when the load is very small and the capacitor 111 is able to keep the output voltage in the range for a longer time than the switching period.

The current sense circuitry embedded in SW2 and current sense circuitry 113 may protect the power components from over-current conditions. The current sense circuitry 113 may provide via path 117 to the comparator 119 a signal indicative of the inductor current. The current signal on path 117 may then be compared by the comparator 119 with a preset current limit signal OVC_lim from path 118. The output signal from the comparator 119 via path 120 may be active when the inductor current exceeds the preset limit. When the over-current signal on the path 120 is active, the control logic circuitry 121 may de-assert the SW2_ON signal. This may induce the OFF state of the SW2 switch, and trigger the voltage controlled $t_{OFF}$ generator circuitry 101. At the same time, the over-current signal on path 120 may reset the voltage controlled $t_{ON}$ generator circuitry 125. After $t_{OFF}$ elapses, the control logic circuitry 121 may initiate a new cycle by triggering $t_{ON}$.

Those skilled in the art will recognize that the functions of the above described circuitry 101, 121, 125, 108, 116, and 113 and comparators 107, 119 can be realized using analog circuitry, digital circuitry, or combination of such circuitry. For example, the comparators 107 and 119 should be understood as being either analog or/and digital number comparators. Similarly, the voltage controlled timing generator circuitry 101 and 125 and the feedback circuitry 108 could be built using analog circuitry as well as using programmable counters, gates, analog to digital converters, etc. Furthermore, the voltage controlled timing generator circuitries 101, 125 and the control logic circuitry 101 may be integrated in a single controller or presenting other partitions as long as the functionality is the same. Nevertheless, the switches and the current sense circuitry may be integrated totally or partially into the same integrated circuit. As used herein, an "integrated circuit" means a semiconductor device and/or microelectronic device, such as, for example, a semiconductor integrated circuit chip.

Figure 1C:
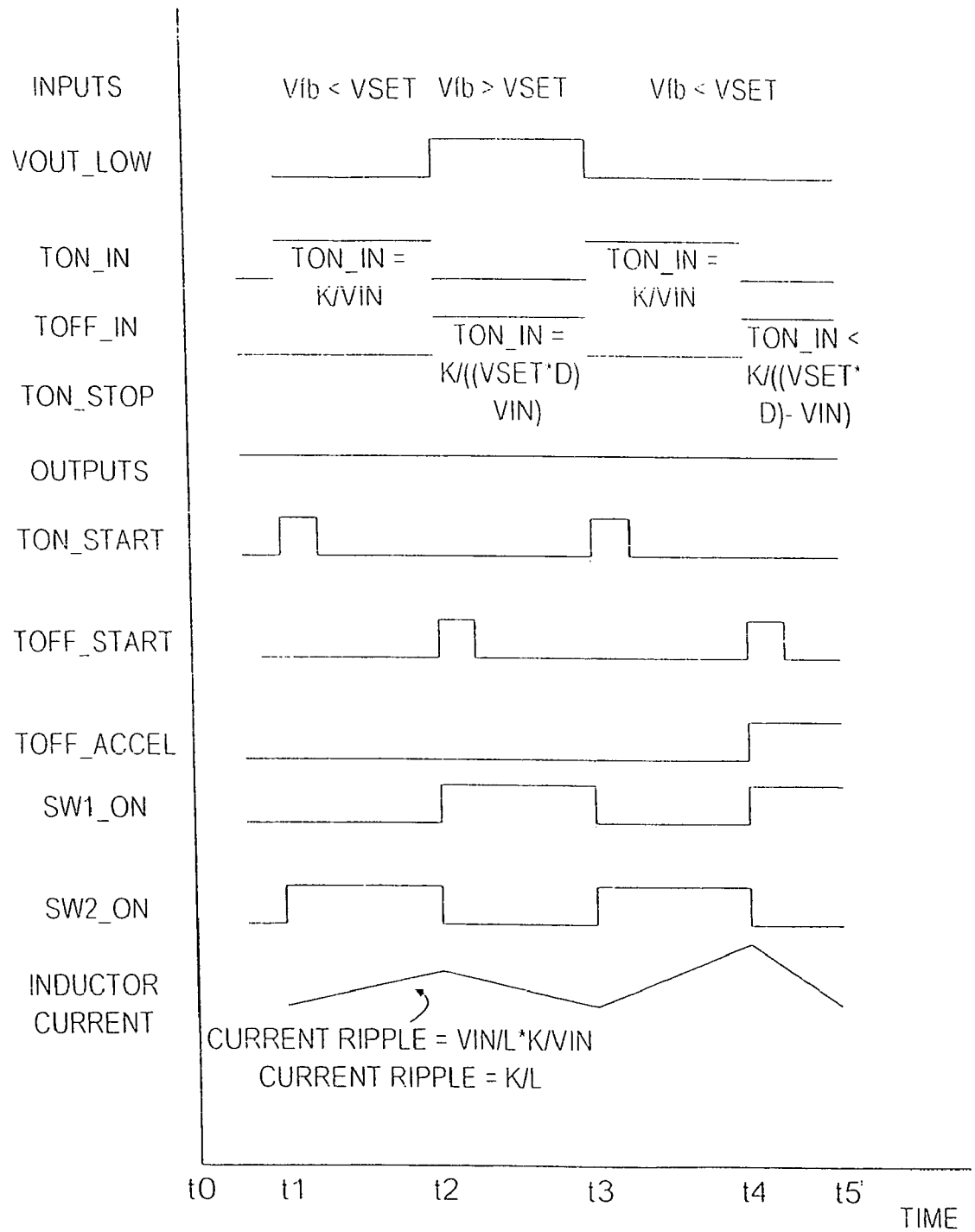
FIG. 1C is a timing diagram of the embodiment of FIG. 1B.

FIG. 1C is a timing diagram to further detail operation of the embodiment of the boost converter 100a of FIG. 1B. Various input and output signals to the control logic circuitry 121 are illustrated over time. During the time interval between t1 and t2, the voltage controlled $t_{ON}$ generator circuitry 125 may provide a TON_IN pulse of a duration based on the input voltage VIN and the constant K given by equation (1) or $t_{ON}=K/V_{IN}$. In response, the SW2_ON signal may be asserted to turn switch SW2 ON. The inductor current in inductor 112 may begin to ramp up during this time interval between times t1 and t2. The change in inductor current $\Delta I_L$ or current ripple during this time interval may be given equation (3) or $\Delta I_L=(V_{IN}/L)*(K/V_{IN})=K/L$.

Between times t2 and t3, the voltage controlled $t_{OFF}$ generator circuitry 101 may provide a TOFF_IN pulse equal in length to that detailed in equation (4) or $t_{OFF}=K/((V_{SET}*D)-V_{IN})$ since the VOUT_LOW signal indicates that Vfb is greater than $V_{SET}$. Switch SW1 may be ON and SW2 may be OFF during this time interval and the inductor current may begin to ramp down. At the time t3, the VOUT_LOW signal indicates that Vfb is less than $V_{SET}$ hence the TON_START command is immediately issued at this time initiating a new cycle. If Vfb is less than $V_{SET}$ as indicated during the time interval between times t4 and t5, an accelerated Toff may occur (TOFF_ACCEL is asserted) where $t_{OFF}$ may be less than $K/((V_{SET}*D)-V_{IN})$.

Figure 1D:
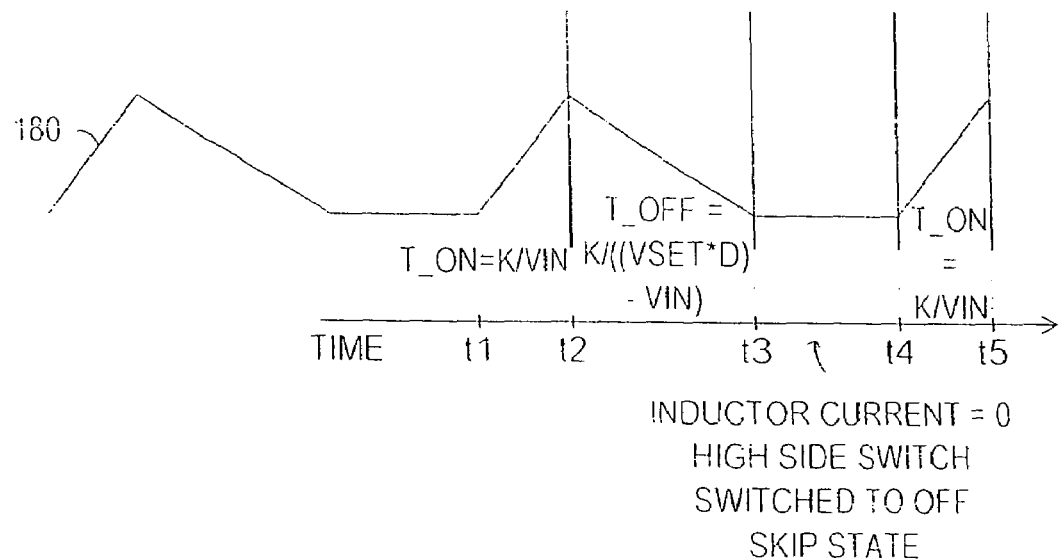
FIG. 1D is another timing diagram of the embodiment of FIG. 1B contrasting operation under heavy and light load conditions.
Figure 1D:
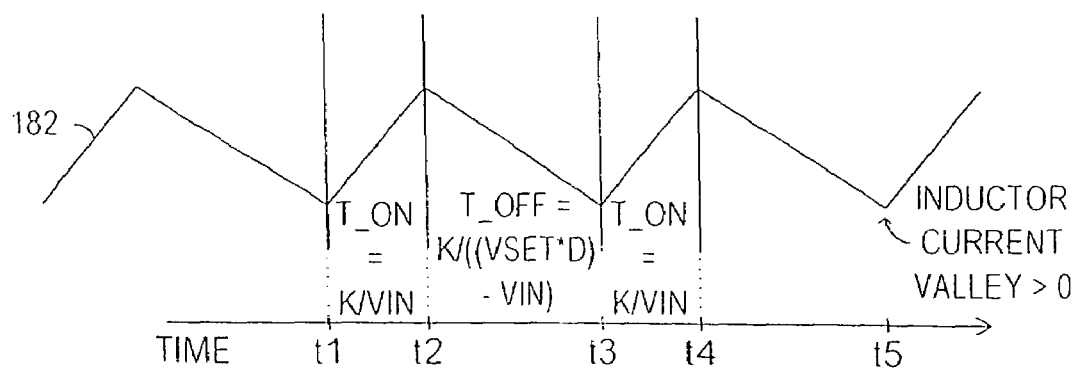

FIG. 1D is a timing diagram to further detail operation of the embodiment of the boost converter 100a of FIG. 1B and contrast operation under heavy and light load conditions. Generally, plot 180 is a plot of inductor current for the inductor 112 over time during light load conditions and plot 182 is a plot of inductor current over time during heavy load conditions. The VOUT_LOW signal provided by comparator 107 may indicate light and heavy load conditions. When Vfb is less than $V_{SET}$, this may be representative of heavier load conditions and when Vfb is greater than $V_{SET}$, this may be representative of lighter load conditions.

Between times t1 and t2 for plot 180, inductor current may rise during a Ton time interval equal to K/Vin. Between times t2 and t3 for plot 180, inductor current may fall during a $t_{OFF}$ time interval. The $t_{OFF}$ time interval between times t2 and t3 for plot 180 may be equal to equation (4) or $t_{OFF}=K/((V_{SET}*D)-V_{IN})$. At the expiration this time interval at time t3, load conditions may still be light load conditions as indicated by the VOUT_LOW signal. At this time t3 the inductor current may be zero. When the inductor current reaches zero, a reverse current may flow from the higher output voltage source through the high side switch SW1 and inductor 112 into the lower input voltage source Vin. To prevent such a reverse current flow, the control logic circuitry 201 opens the high side switch SW1 during the time interval between times t3 and t4 of plot 180. The control logic circuitry 201 may keep both switches SW1 and SW2 OFF between times t3 and t4 of plot 180 until VOUT_LOW changes states (when Vfb<$V_{SET}$) and then start the next T_ON cycle at time t4. The open state of switches SW1 and SW2 between times t3 and t4 of plot 180 may be referred to herein as a skip state. Advantageously therefore, the control logic circuitry 201 can predict when the zero current inductor condition will be reached (time t3) based on expiration of the time duration defined by equation (4) or $t_{OFF}=K/((V_{SET}*D)-V_{IN})$.

In contrast, plot 182 illustrates operation under heavier load conditions. Such heavier load conditions may be indicated by the VOUT_LOW signal when Vfb is less than $V_{SET}$. Between time interval t2 and t3 of plot 182 the $t_{OFF}$ time interval may be less than $K/((V_{SET}*D)-V_{IN})$. As such, the $t_{OFF}$ period in plot 182 is shortened compared to that of plot 180. At times t3 and t5 of plot 182, the valley of the inductor current of plot 182 is greater than zero and the predictive formulae of a time off interval equal to $K/((V_{SET}*D)-V_{IN})$ to predict when a zero current inductor condition occurs is not reached in this instance. Hence, a high side and low side switch OFF or skip state is not reached in this instance.

Figure 2A:
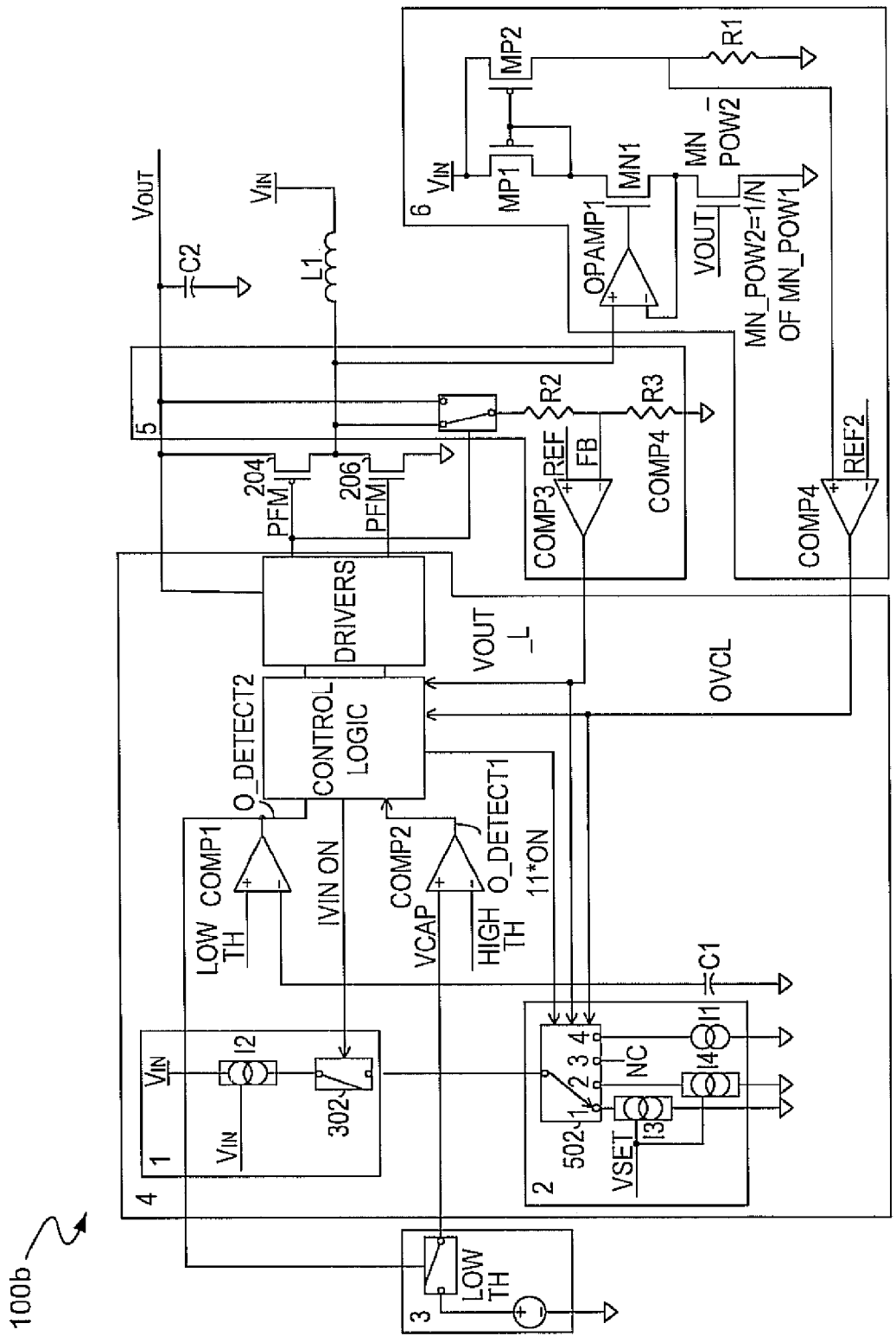
FIG. 2A is a block diagram of another embodiment of the boost converter of FIG. 1A.

FIG. 2A is a block diagram of another boost converter 100b consistent with another embodiment. The charging current source 1 and discharging current source 2 may generate a voltage waveform at node Vcap, which emulates the current that flows through the inductor L1. The Vcap voltage together with output voltage of the feedback comparator comp3 may trigger the control logic circuitry 201 to generate appropriate pulses to drive the high side switch 204 and low side switch 206.

Figure 2B:
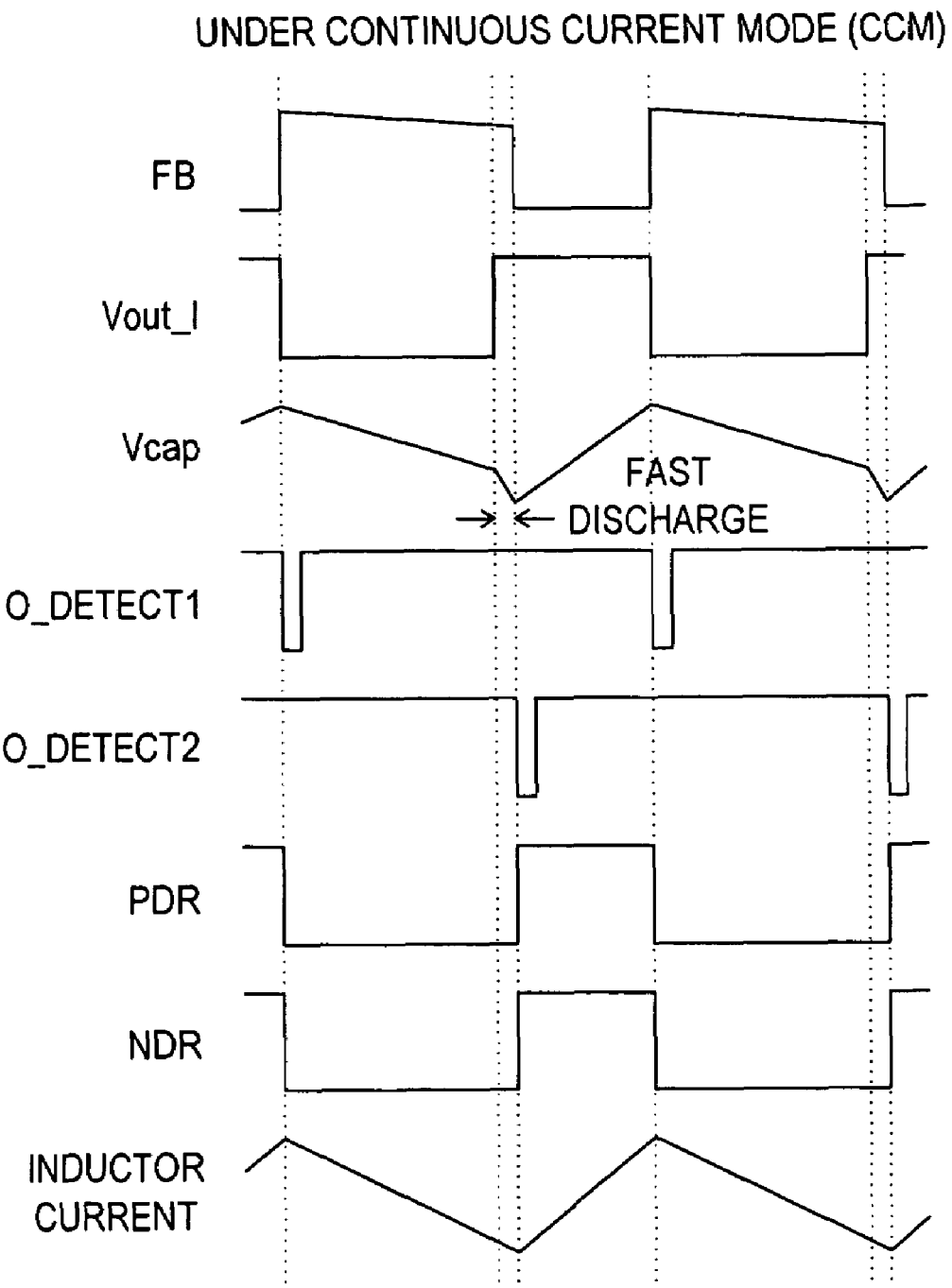
FIG. 2B is a timing diagram for the boost converter of FIG. 2A operating in a continuous current mode.

FIG. 2B is a timing diagram to explain the operation of the boost converter 100b of FIG. 2A operating in a continuous current mode (CCM). Plot fb is a plot representative of the output voltage Vout scaled down by the resistor divider including resistors R2 and R3. The fb plot may be one input to the comparator Comp3. Plot Vout_is plot representative of the output of the comparator Comp3 which compares the fb plot with a reference voltage. This Vout_voltage may be provided to the control logic circuitry 201 to inform it whether Vout is less than the reference voltage. Vcap is a plot representative of the voltage waveform of the internal capacitor C1 which may be input to both comparators Comp1 and Comp2 to control the frequency of the high side switch pdr and low side switch ndr driving signals. The comparators Comp1 and Comp2 may also be referred to as an activation generator and a disactivation generator respectively.

The o_detect1 plot may be output from the comparator Comp2 based on a comparison of the Vcap plot and a high threshold level highTH. The o_detect1 plot may send a low signal to the control logic circuitry 201 whenever Vcap goes higher than the highTH. In response, the pdr drive signal that drives the high side switch 204 may go low to drive the high side switch 204 OFF and the low side switch drive signal ndr may go high to drive the low side switch 206 ON. The inductor current of inductor L1 may then begin to ramp up.

The o_detect2 plot may be output from the comparator Comp1 based on a comparison of the Vcap plot and a low threshold level lowTH. The o_detect2 plot may send a low signal to the control logic circuitry 201 whenever Vcap goes lower than the lowTH. In response, the pdr drive signal may go high to drive the high side switch 204 ON and the low side switch drive signal ndr may go low to drive the low side switch 206 OFF. The inductor current may then ramp down.

Figure 2C:
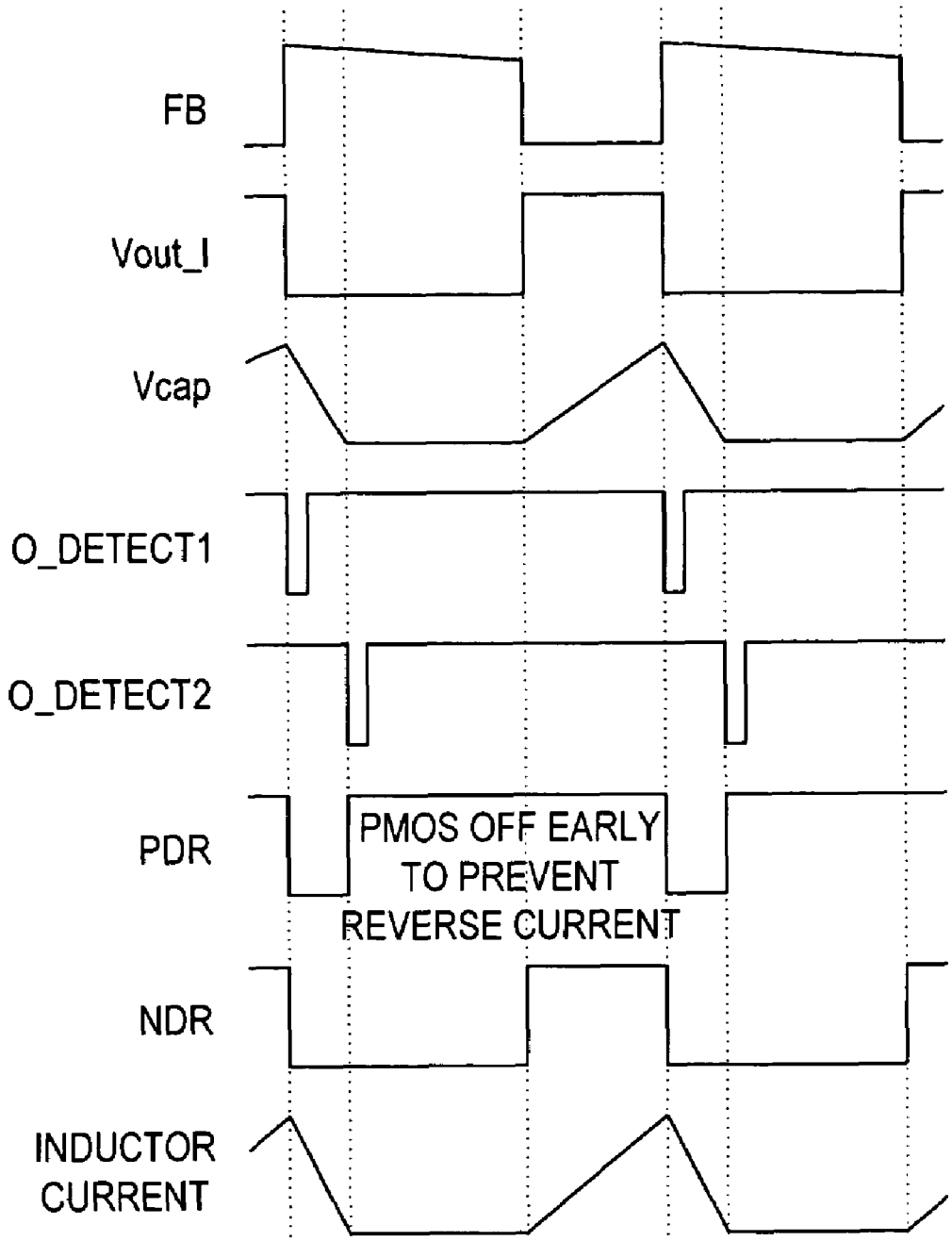
FIG. 2C is a timing diagram for the boost converter of FIG. 2A operating in a discontinuous current mode.

FIG. 2C is another timing diagram to explain the operation of the boost converter 100b of FIG. 2A operating in a discontinuous current mode (DCM). The plots of FIG. 2C represent various inputs and outputs to the comparators Comp1, Comp2, and Comp3, Vcap voltage, high and low side driving signals pdr and ndr, and inductor current flowing in inductor L1 that were detailed with respect to FIG. 2b and any repetitive explanations are omitted herein for clarity. In the DCM of FIG. 2C, the o_detect1 signal again sends a low signal to the control logic circuitry 201 whenever Vcap goes higher than the highTH signal. In response, both the high and low side driving signals pdr and ndr go low in DCM mode.

Figure 3:
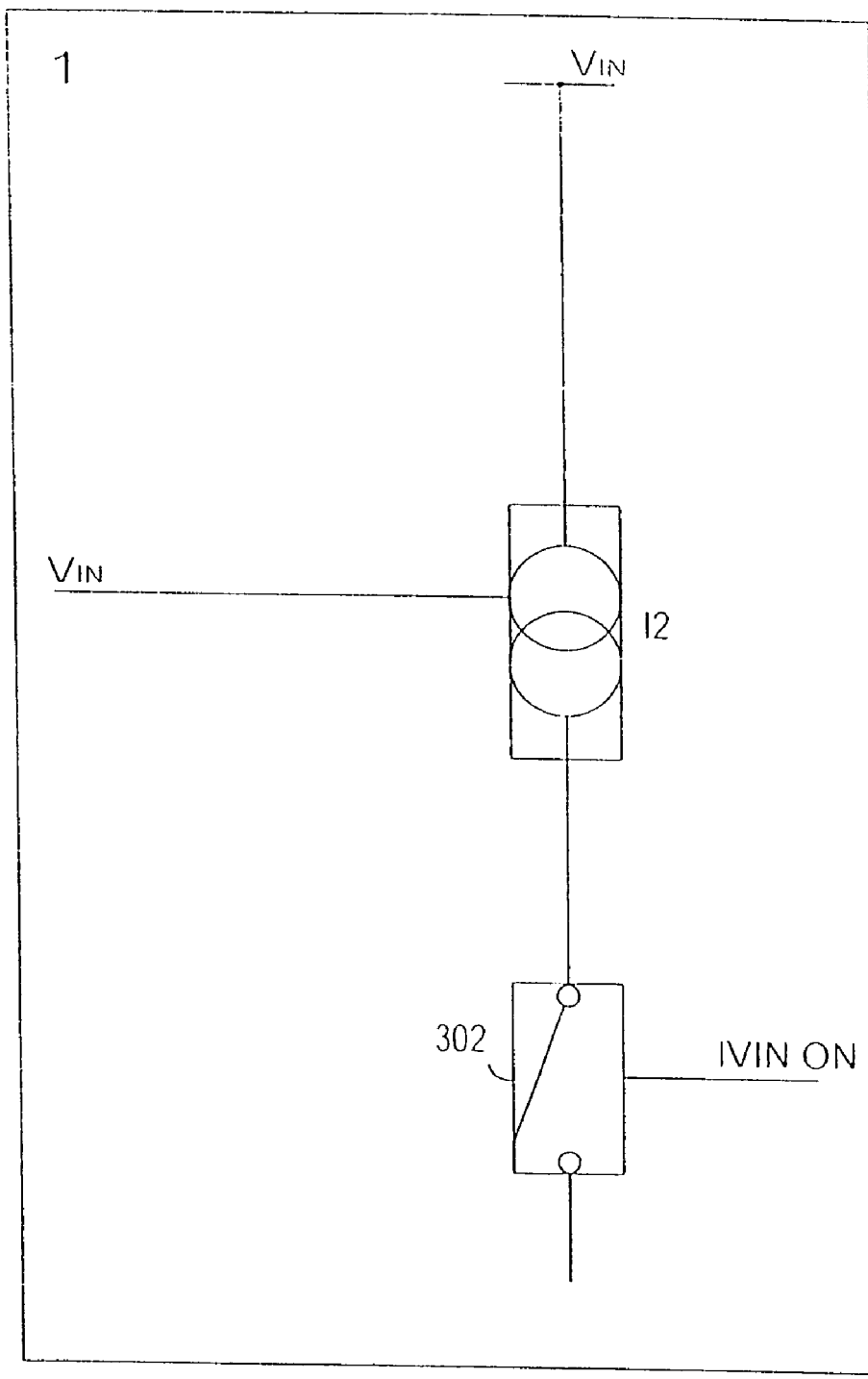
FIG. 3 is a circuit diagram of the voltage controlled current source of FIG. 2A.

FIG. 3 illustrates the current source 1 of FIG. 2. This current source may be controlled by the switching signal ivin_on provided to the switch 302 by the control logic circuitry 201. When the switch 302 is open, current source I2 is disconnected from capacitor C1. When the switch 302 is closed, the current source I2 is connected to capacitor C1. Depending, in part, on the position of the switch 302, the capacitor C1 may be charged or discharged.

Figure 4:
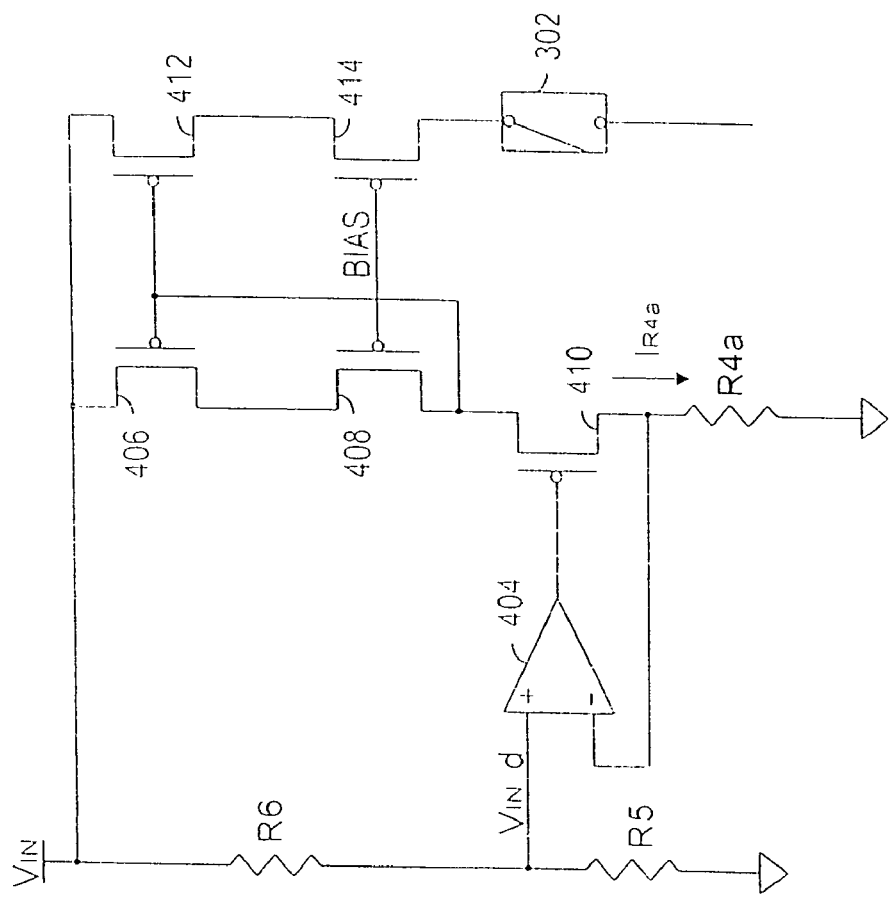
FIG. 4 is a circuit diagram of one potential embodiment of the voltage controlled current source of FIG. 3.

FIG. 4. is a circuit diagram of one embodiment of the current source of FIG. 3 The voltage divider formed by resistors R6 and R5 may scale down the input voltage Vin to a lesser voltage level Vin_d where Vin_d=(R5/(R5+R6))*Vin. The voltage follower formed by opamp 404 and transistor 410 may replicate the Vin_d voltage across resistor R4a. This may then result in current $I_{R4a}$ flowing through resistor R4a and transistors 410, 408, and 406. The current mirror formed by transistors 408, 406, 412, and 414 may then mirror current $I_{R4a}$ to switch 302 with a ratio of (R6+R5)/R5. The final current flowing through the switch 302 may represent the current level provided by the current source I2 in FIG. 3 given by I2=Vin/R4a.

Figure 5:
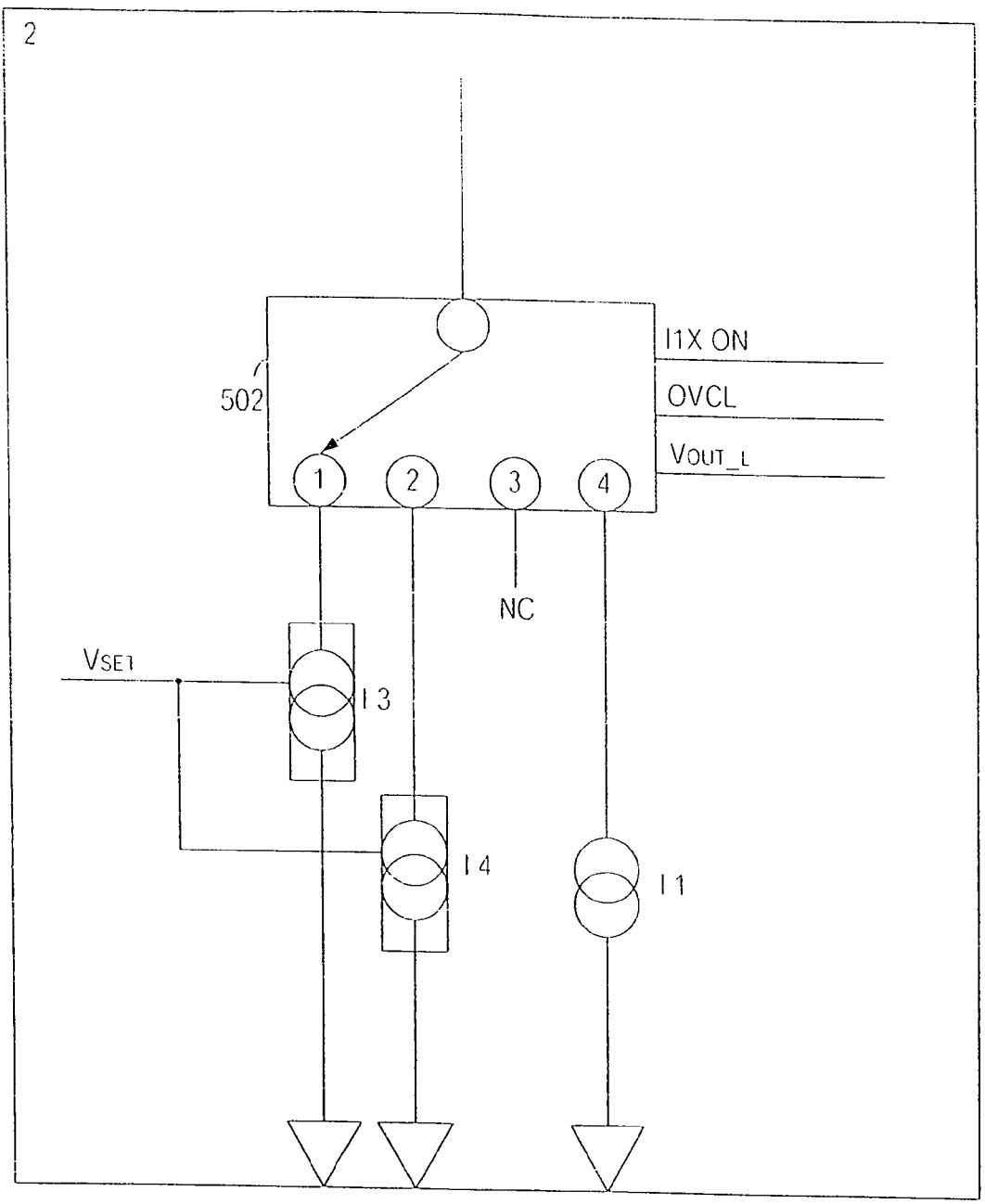
FIG. 5 is a circuit diagram of the voltage controlled switchable current sink of FIG. 2A.

FIG. 5 is a diagram of the discharging current source 2 of FIG. 2. The discharging current source 2 may include a switch 502 and a plurality of current sinks I1, I3, and I4. Current sink I3 may be a current sink proportional to a set voltage, $V_{SET}$. Current sink I4 may be a current sink of a value greater than I3, e.g., 7 times greater than I3 in one instance. The position of the switch 502 may be responsive to a plurality of control signals from a plurality of sources. The control signals may include the i1X_on signal from the control logic circuitry 201, the ovcl signal output from the comparator Comp4 of the current sensing circuitry 6, and the vout_1 signal from the comparator Comp3 of the feedback circuitry 5. The position of the switch 502 may be in switch position 1, 2, 3, or 4 as illustrated in FIGS. 2 and 5 depending on the state of the i1X_on, ovcl, and vout_1 signals as detailed in Table 1.

TABLE 1

| i1X_on | vout_1 | ovcl | Switch Position |
|---|---|---|---|
| 0 | X | X | 3 |
| 1 | 0 | 0 | 1 |

TABLE 1-continued

| i1X_on | vout_1 | ovcl | Switch Position |
|---|---|---|---|
| 1 | X | 1 | 4 |
| 1 | 1 | 0 | 2 |

Figure 6:
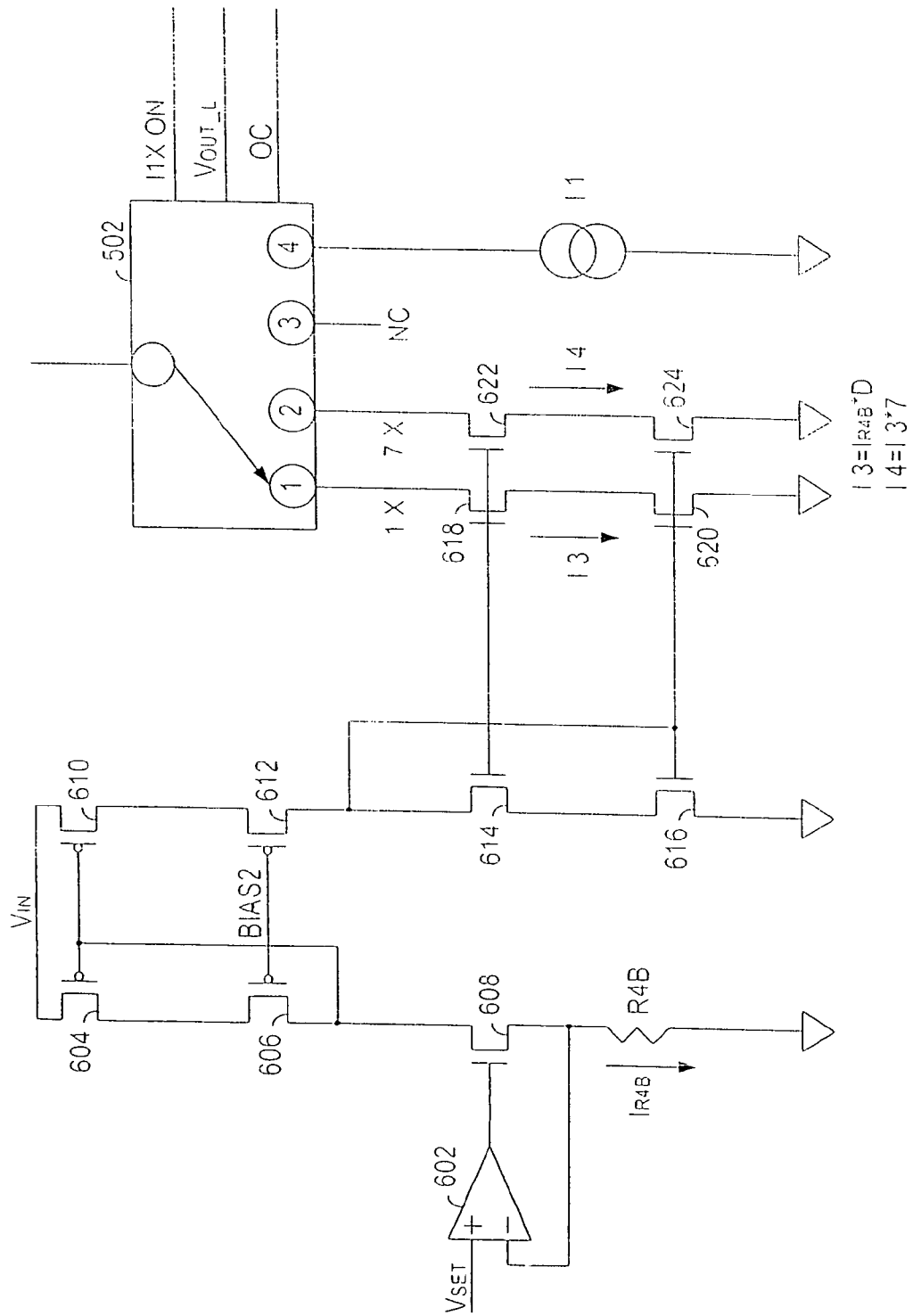
FIG. 6 is a circuit diagram of one potential embodiment of the voltage controlled switchable current sink of FIG. 5.

FIG. 6 depicts one potential embodiment of the switch-able current sink of FIG. 5. Resistor R4a from FIG. 4 and resistor R4b from FIG. 6 may be matched. The voltage follower formed by opamp 602 and transistor 608 may replicate the Vset voltage across resistor R4b resulting in current $I_{R4b}$=Vset/R4b. Using two sets of current mirrors (transistors 604, 606, 610, 612 614, 616, 618, 620, 622 and 624), $I_{R4b}$ may be mirrored to position 1 and 2 of switch 502. The current levels $I_3$ and $I_4$ at position 1 and 2 of switch 502 may be determined by equations (4a) and (4b).

$$I_3 = I_{R4b} * D \quad (4a)$$

$$I_4 = 7 * I_3 \quad (4b)$$

Figure 7:
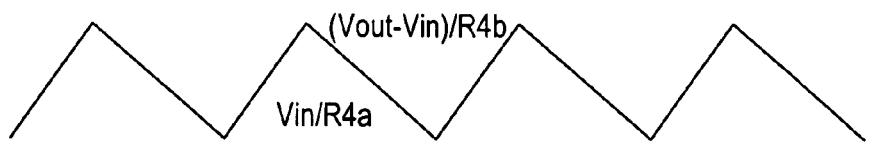
FIG. 7 is a plot of waveforms for Vcap, ndr, and pdr of FIG. 2A in a continuous current mode.
Figure 7:
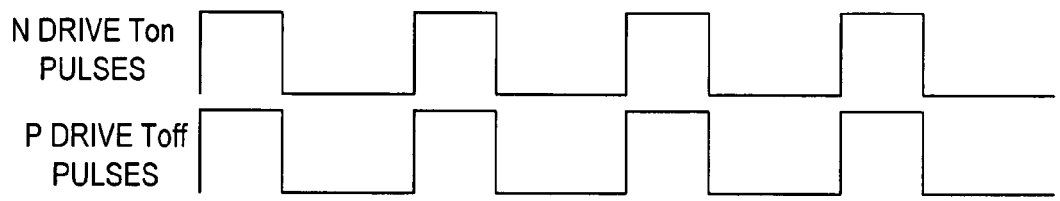

FIG. 7 illustrates the voltage waveform at the node Vcap, as well as the high side switch 204 and low side switch 206 driving pulses when the boost converter of FIG. 2 is operating in a continuous current mode with reference also to FIGS. 4 and 6. The on time $t_{ON}$ may be determined by a constant current source with a value equal to Vin_d/R4a. Whereas, the off time $t_{OFF}$ may be determined by a constant discharging current source with a value equal to −(Vset−Vin)/R4ab. If the value of the capacitor C1 at node Vcap is C and the value of the voltage swing is equal to 1V, one can write, equations (5) and (6).

$$t_{ON} = R4a \times C / Vin\_d \quad (5)$$

$$t_{OFF} = R4b \times C / (Vset - Vin\_d) \quad (6)$$

If R4a=R4b, the duty cycle D=$t_{ON}/(t_{ON}+t_{OFF})$=(Vset−Vin_d)/Vset, which is the well know equation for a boost converter.

Figure 8:
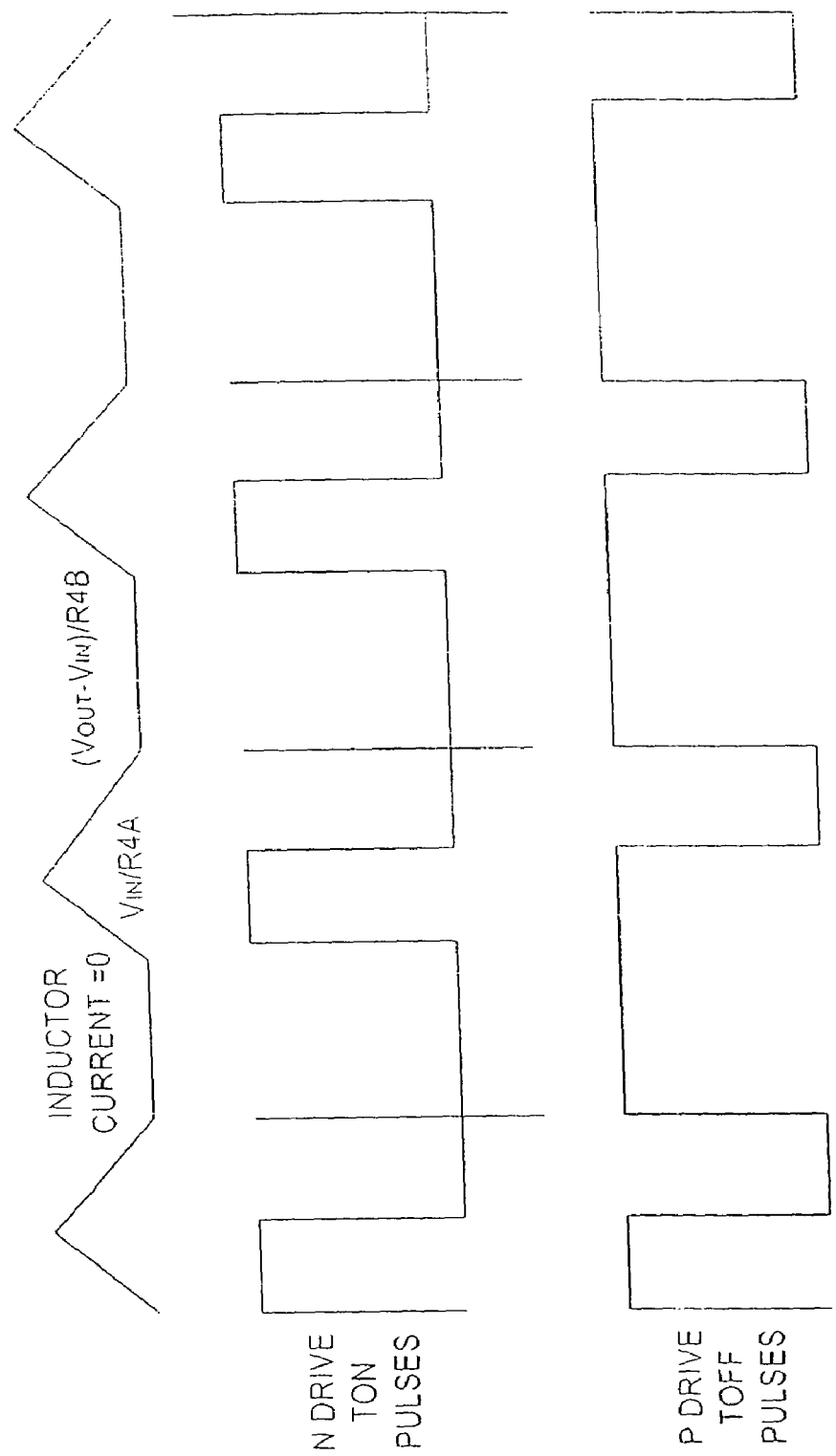
FIG. 8 is a plot of waveforms for Vcap, ndr, and pdr of FIG. 2A in a discontinuous current mode.

FIG. 8 shows the voltage waveform at the node Vcap, as well as the ndr and pdr driving pulses when the converter of FIG. 2 is operating in the discontinuous current mode or pulse skipping mode with reference also to FIGS. 4 and 6. In the discontinuous mode, the high side switch 204 may be turned OFF when the inductor current falls almost to zero to prevent reverse current from the higher output voltage to the lower input voltage. Such a reverse current may not occur under heavier load conditions since the heavy current draw of the load would quickly reduce the output voltage level. Accordingly, the controller for the DC to DC converter is capable of predicting when the inductor current is approaching zero in the discontinuous mode and opening both the high and low side switch to prevent a reverse current flow from the output DC voltage through the high side switch to the input DC voltage during a discontinuous current mode operation of the controller. The controller may predict the inductor current is approaching zero in response to expiration of a time interval based on equation (4).

Figure 9:
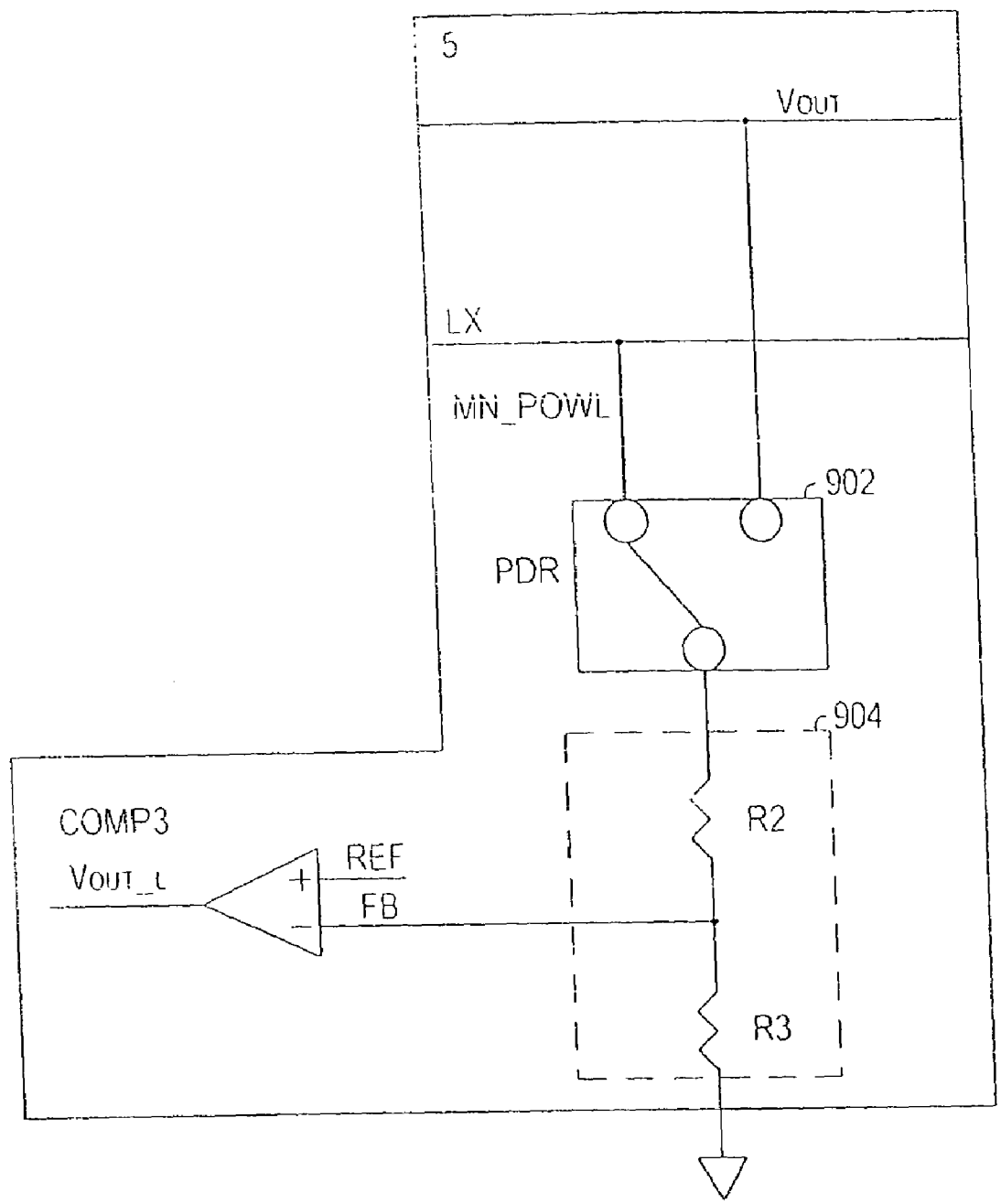
FIG. 9 is a circuit diagram of one embodiment of the feedback control circuitry of FIG. 2A.

FIG. 9 illustrates the feedback control circuitry 5 of FIG. 2. When the high side switch 204 is turned ON, the switch 902 which may be a single-pole double throw switch may connect the feedback divider 904 including resistors R2, R3 to node LX thereby sensing the output voltage less the voltage drop across the on resistance Ron of the high side switch 204. When high side switch 204 is turned OFF, the switch 902 may connect the feedback divider 904 to Vout. Advantageously, this feedback control may provide a voltage feedback signal summed with an output current component, assuring good loop stability without the need of any current sensing resistor to sense the current level through the inductor L1, which would reduce the converter's efficiency.

Figure 10:
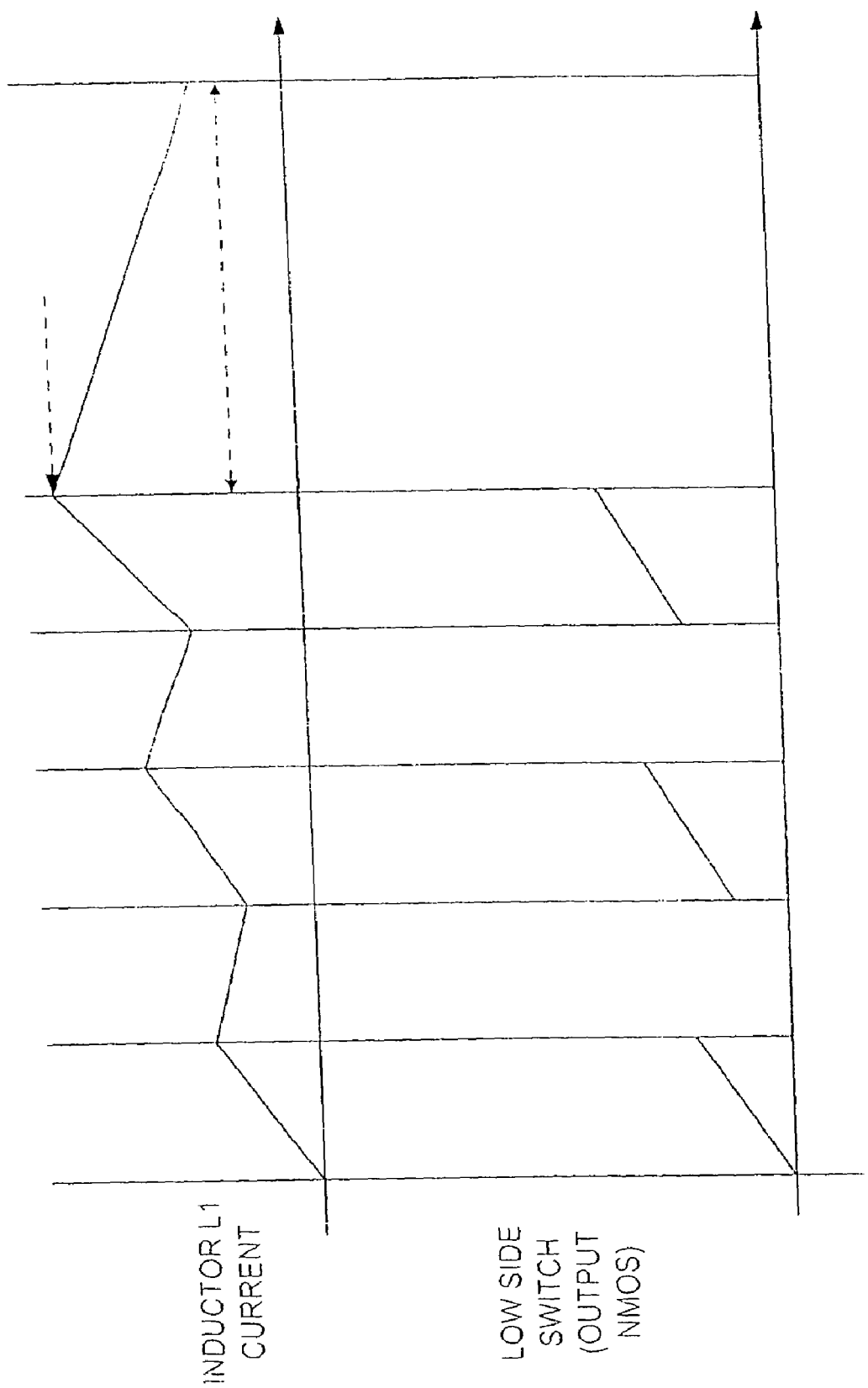
FIG. 10 is a plot of waveforms illustrating voltage and current plots of several components of FIG. 2A.

FIG. 10 illustrates voltage and current waveforms related with over-current protection. Over-current protection may be achieved by detecting the output current during the on time of the low side switch 206 (e.g., NMOS transistor MN_pow1). If the detected current exceeds a current threshold, the over-current signal (OC) is activated. This may then switch the switch 502 of switch-able current sink to position 4 (Refer to Table 1), and the low side switch 206 may be switched OFF simultaneously with the turning ON of the high side switch 204. In this way, excess current may be discharged through high side switch 204 to the output.

The switch-able sink current 2 with the switch 502 at position 4 may determine the duration of the discharge cycle. This current may be arbitrarily chosen but the value should be less than 1X current sink. At the end of the discharge cycle, the inductor current (i.e. the output current) may have dropped below the current threshold. Then, normal regulation cycle of the boost converter may resume and current sensing is repeated for subsequent ON cycles of the low side switch 206.

Figure 11:
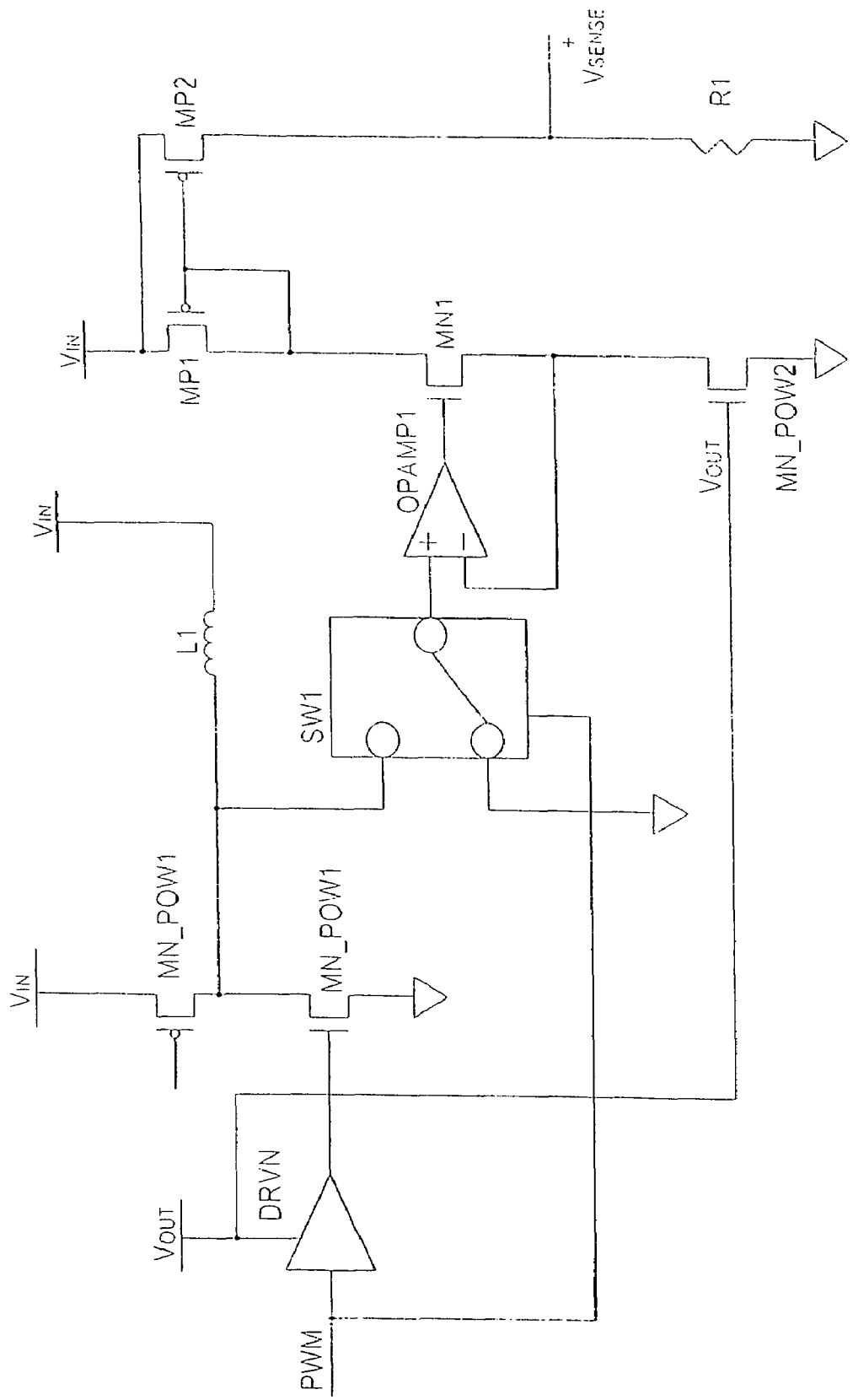
FIG. 11 is a circuit diagram of one embodiment of the current sensing circuitry of FIG. 2A.

FIG. 11 depicts one embodiment of the current sensing circuitry 6 of FIG. 2. The output current may be sensed using a MOSFET (MN_pow2), which replicates the current flowing through the output NMOS (MN_pow1) or the low side switch 206 when it is ON. Transistor MN_pow2 may have a substantially smaller area ratio with respect to the output NMOS (MN_pow1). By applying the same gate voltage and drain source voltage of MN_pow1 during its on time to MN_pow2, its current may be proportional to the actual output current of transistor MN_pow1. When transistor MN_pow1 is turned ON, its drain-source voltage may be replicated on the drain-source of transistor MN_pow2 using the switch SW1 and the operational amplifier OPAmp 1 voltage follower. The gate drive for transistor MN_pow2 may be tied to a fixed voltage that is equal to the gate drive voltage of transistor MN_pow1. The sensed current may be mirrored to resistor R1. The resulting voltage across R1 may then represent the output current.

$$\frac{Area\_MN\_pow1}{Area\_MN\_pow2} = \frac{Current\_in\_MN\_pow1}{Current\_in\_MN\_pow2}$$

By comparing the voltage across R1 with a reference voltage ref2 in the comparator comp4 (see FIG. 2A), the over-current condition may then be detected. When the voltage across resistor R1 exceeds the ref2 voltage, the over-current signal ovcl may be activated. This may then trigger the discharge cycle as described with reference to FIG. 10.

In summary, one embodiment may include a DC to DC converter for converting an input DC voltage to an output DC voltage. The DC to DC converter may comprise at least one switch, an inductor coupled to the at least one switch, and a controller capable of providing a control signal. The at least one switch may be responsive to the control signal in a first state to enter an ON state for an ON time interval, and the ON time interval may be based on the input DC voltage and a constant.

Another embodiment may include an electronic device comprising a DC to DC converter for converting an input DC voltage to an output DC-voltage. The DC to DC converter may comprise at least one switch, an inductor coupled to the at least one switch, and a controller capable of providing a control signal. The at least one switch may be responsive to the control signal in a first state to enter an ON state for an ON time interval, and the ON time interval may be based on the input DC voltage and a constant.

Yet another embodiment may comprise a method. The method may comprise providing a control signal to at least one switch of a DC to DC converter; providing the control signal in a first state, the at least one switch responsive to the control signal in the first state to enter an ON state for an ON time interval; and controlling the ON time interval based on an input DC voltage to the DC to DC converter and a constant.

In yet another embodiment, a boost DC to DC converter for converting an input DC voltage to an output DC voltage higher than the input DC voltage is provided. The boost converter may comprise a high side and low side switch; an inductor coupled to the high and low side switches; and a controller capable of controlling a state of the high and low side switches to switch the high side switch OFF and the low side switch ON during a time ON state. The low side switch may remain ON during the time ON state for an ON time interval based on the input DC voltage and a constant. The controller may further be capable of controlling the state of the high and low side switches to switch the high side switch ON and the low side switch OFF during a time OFF state. The controller may further be capable of predicting when a current level through the inductor reaches zero and controlling the state of the high and low sides switches to switch the high side switch OFF and the low side switch OFF during a skip state to prevent a reverse current flow from the output DC voltage through the high side switch to the input DC voltage.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. A DC to DC converter for converting a DC input voltage to a DC output voltage, said DC to DC converter comprising:
   an inductor for receiving said DC input voltage and a current flowing through said inductor;
   a controller coupled to said inductor and comprising a capacitor having a voltage capable of emulating said current of said inductor in a continuous current mode and a discontinuous current mode, wherein said controller is capable of generating at least one pulse frequency modulation signal according to a first comparison between said voltage of said capacitor and a first predetermined level and according to a second comparison between said voltage of said capacitor and a second predetermined level;
   at least one switch coupled to said inductor, wherein said at least one switch is controlled by said at least one pulse frequency modulation signal from said controller and provides said DC output voltage; and
   a feedback circuit coupled to said inductor, wherein said feedback circuit selectively senses said DC output voltage or a voltage at a terminal of said at least one switch and generates a feedback signal.

2. A DC to DC converter for converting a DC input voltage to a DC output voltage, said DC to DC converter comprising:

an inductor for receiving said DC input voltage and a current flowing through said inductor;

a controller coupled to said inductor and capable of generating at least one pulse frequency modulation signal;

at least one switch coupled to said inductor, wherein said at least one switch is controlled by said at least one pulse frequency modulation signal from said controller and provides said DC output voltage; and a feedback circuit coupled to said inductor, wherein said feedback circuit selectively senses said DC output voltage or a voltage at a terminal of said at least one switch and generates a feedback signal;

wherein said controller comprises:

a capacitor having a voltage that is capable of emulating said current of said inductor in a continuous current mode and a discontinuous current mode;

an activation generator capable of providing a first pulse signal;

a disactivation generator capable of providing a second pulse signal;

a control logic circuit coupled to said activation generator and said disactivation generator, wherein said control logic circuit is triggered by said feedback signal from said feedback circuit and is capable of receiving said first pulse signal, said second pulse signal and said feedback signal and generating a charge current, a discharge current and a plurality of control signals; and a driver for receiving said plurality of control signals from said control logic circuit and generating said at least one pulse frequency modulation signal to control said at least one switch.

3. The DC to DC converter of claim 2, wherein said first pulse signal has a first duration, said first duration is determined by said charge current, said capacitor is charged by said charge current during said first duration, and said charge current is proportional to said DC input voltage during said first duration.

4. The DC to DC converter of claim 3, wherein said inductor is charged when said at least one switch is turned on during said first duration, and wherein a rate of change in current with time of said inductor is proportional to said DC input voltage during said first duration.

5. The DC to DC converter of claim 2, wherein said second pulse signal has a second duration, said second duration depends on said feedback signal from said feedback circuit, said second duration includes a discharging duration and a skip duration, said discharging duration is determined by said discharge current, said capacitor is discharged by said discharge current during said discharging duration, and said discharge current is proportional to voltage variance between said DC output voltage and said DC input voltage during said discharging duration.

6. The DC to DC converter of claim 5, wherein said inductor is discharged when said at least one switch is turned off during said discharging duration, and wherein a rate of change in current with time of said inductor is proportional to said voltage variance between said DC output voltage and said DC input voltage during said discharging duration.

7. The DC to DC converter of claim 6, wherein said voltage of said capacitor reaches a lowest value after said discharging duration, said current of said inductor is discharged to zero after said discharging duration, and said at least one switch is turned off in said skip duration.

8. The DC to DC converter of claim 7, wherein said voltage of said capacitor emulates said current of said inductor during said discharging duration.

9. An electronic device comprising:

a DC to DC converter for converting a DC input voltage to a DC output voltage, said DC to DC converter comprising:

an inductor for receiving said DC input voltage and a current flowing through said inductor;

a controller coupled to said inductor and comprising a capacitor having a voltage that is capable of emulating said current of said inductor in a continuous current mode and a discontinuous current mode, wherein said controller is capable of generating at least one pulse frequency modulation signal according to a first comparison between said voltage of said capacitor and a first predetermined level and according to a second comparison between said voltage of said capacitor and a second predetermined level;

at least one switch coupled to said inductor, wherein said at least one switch is controlled by said at least one pulse frequency modulation signal from said controller and provides said DC output voltage; and a feedback circuit coupled to said inductor, wherein said feedback circuit selectively senses said DC output voltage or a voltage at a terminal of said at least one switch and generates a feedback signal.

10. An electronic device comprising:

a DC to DC converter for converting a DC input voltage to a DC output voltage, said DC to DC converter comprising:

an inductor for receiving said DC input voltage and a current flowing through said inductor;

a controller coupled to said inductor and capable of generating at least one pulse frequency modulation signal;

at least one switch coupled to said inductor, wherein said at least one switch is controlled by said at least one pulse frequency modulation signal from said controller and provides said DC output voltage; and a feedback circuit coupled to said inductor, wherein said feedback circuit selectively senses said DC output voltage or a voltage at a terminal of said at least one switch and generates a feedback signal;

wherein said controller comprises:

a capacitor having a voltage that is capable of emulating said current of said inductor in a continuous current mode and a discontinuous current mode;

an activation generator capable of providing a first pulse signal;

a disactivation generator capable of providing a second pulse signal;

a control logic circuit coupled to said activation generator and said disactivation generator, wherein said control logic circuit is triggered by said feedback signal from said feedback circuit and is capable of receiving said first pulse signal, said second pulse signal and said feedback signal and generating a charge current, a discharge current and a plurality of control signals; and a driver for receiving said plurality of control signals from said control logic circuit and generating said at least one pulse frequency modulation signal to control said at least one switch.

11. The electronic device of claim 10, wherein said first pulse signal has a first duration, said first duration is determined by said charge current, said capacitor is charged by said charge current during said first duration, and said charge current is proportional to said DC input voltage during said first duration.

12. The electronic device of claim 11, wherein said inductor is charged when said at least one switch is turned on during said first duration, wherein a rate of change in current with time of said inductor is proportional to said DC input voltage during said first duration.

13. The electronic device of claim 10, wherein said second pulse signal has a second duration, said second duration depends on said feedback signal from said feedback circuit, said second duration includes a discharging duration and a skip duration, said discharging duration is determined by said discharge current, said capacitor is discharged by said discharge current during said discharging duration, and said discharge current is proportional to voltage variance between said DC output voltage and said DC input voltage during said discharging duration.

14. The electronic device of claim 13, wherein said inductor is discharged when said at least one switch is turned off during said discharging duration, wherein a rate of change in current with time of said inductor is proportional to said voltage variance between said DC output voltage and said DC input voltage during said discharging duration.

15. The electronic device of claim 14, wherein said voltage of said capacitor reaches a lowest value after said discharging duration, said current of said inductor is discharged to zero after said discharging duration, and said at least one switch is turned off in said skip duration.

16. The electronic device of claim 15, wherein said voltage of said capacitor emulates said current of said inductor during said discharging duration.

17. A boost DC to DC converter for converting a DC input voltage to a DC output voltage higher than said DC input voltage, said boost DC to DC converter comprising:
   an inductor for receiving said DC input voltage and a current flowing through said inductor;
   a controller coupled to said inductor and comprising a capacitor having a voltage that is capable of emulating said current of said inductor in a continuous current mode and a discontinuous current mode, wherein said controller is capable of generating a first pulse frequency modulation signal and a second pulse frequency modulation signal according to a first comparison between said voltage of said capacitor and a first predetermined level and according to a second comparison between said voltage of said capacitor and a second predetermined level;
   a high side switch and a low side switch coupled to said inductor, wherein said high side and low side switches are controlled respectively by said first and second pulse frequency modulation signals from said controller, and said high side switch is operable for providing said DC output voltage; and
   a feedback circuit coupled to said inductor, wherein said feedback circuit selectively senses said DC output voltage or a voltage at a terminal of said high side switch and generates a feedback signal.

18. The boost DC to DC converter of claim 17, wherein said controller comprises:
   a current source capable of generating a charge current to charge said capacitor;
   a switchable current sink capable of generating a discharge current to discharge said capacitor, wherein said voltage of said capacitor depends on said charge current and said discharge current;
   a control logic circuit, wherein said control logic circuit is triggered by said voltage of said capacitor and generates a plurality of control signals according to said first comparison and according to said second comparison, and
   a driver, wherein said driver receives said plurality of control signals from said control logic circuit and generates said first pulse frequency modulation signal to control said high side switch and generates said second pulse frequency modulation signal to control said low side switch.

19. The boost DC to DC converter of claim 18, wherein said first pulse frequency modulation signal has a first duration, said first duration is determined by said first comparison between said voltage of said capacitor and said first predetermined level, said capacitor is charged by said charge current during said first duration, and said charge current is proportional to said DC input voltage during said first duration.

20. The boost DC to DC converter of claim 19, wherein said inductor is charged when said high side switch is turned off and said low side switch is turned on during said first duration, wherein a rate of change in current with time of said inductor is proportional to said DC input voltage during said first duration.

21. The boost DC to DC converter of claim 18, wherein said second pulse frequency modulation signal has a second duration, said second duration is determined by said second comparison between said voltage of said capacitor and said second predetermined level, said capacitor is discharged by a discharge current during said second duration, and said discharge current is proportional to voltage variance between said DC output voltage and said DC input voltage during said second duration.

22. The boost DC to DC converter of claim 21, wherein said inductor is discharged when said high side switch is turned on and said low side switch is turned off during said second duration, wherein a rate of change in current with time of said inductor is proportional to said voltage variance between said DC output voltage and said DC input voltage during said second duration.

23. The boost DC to DC converter of claim 22, wherein said voltage of said capacitor reaches a lowest value after said second duration, said current of said inductor is discharged to zero after said second duration, and said high side switch is turned off after said second duration.

24. The boost DC to DC converter of claim 23, wherein said voltage of said capacitor emulates said current of said inductor during said second duration.

25. The boost DC to DC converter of claim 18, wherein said current source comprises:
   a voltage divider, wherein said voltage divider scales down said DC input voltage and generates a scaled-down voltage;
   a voltage follower, wherein said voltage follower receives said scaled-down voltage and generates a first current;
   a plurality of current mirrors, wherein said plurality of current mirrors mirror said first current and generate a second current; and
   a switch coupled to said plurality of current mirrors, wherein said switch sends said second current to charge said capacitor when said switch is turned on.

26. The boost DC to DC converter of claim 18, wherein said switchable current sink comprises:
   a voltage follower, wherein said voltage follower receives a predetermined voltage and converts said predetermined voltage to a first current;
   a plurality of current mirrors, wherein said plurality of current mirrors receive said first current and generate a plurality of mirrored currents; and
   a multiplex switch coupled to said plurality of current mirrors, wherein said multiplex switch selects one of said mirrored currents and a predetermined current as said discharge current to discharge said capacitor.

27. The boost DC to DC converter of claim 18, wherein said feedback circuit comprises:
- a double throw switch coupled in parallel with said high side switch;
- a voltage divider coupled to said double throw switch, wherein said voltage divider generates a scaled-down voltage; and
- a comparator coupled to said voltage divider, wherein said comparator receives a reference voltage and said scaled-down voltage and generates said feedback signal, and wherein said feedback signal comprises a component of said current of said inductor and triggers said control logic circuit.

28. The boost DC to DC converter of claim 18, wherein said DC to DC converter further comprises a current sense circuit, wherein said current sense circuit detects said current of said inductor and generates a control signal to said control logic circuit.

29. An electronic device comprising:
- a boost DC to DC converter for converting a DC input voltage to a DC output voltage higher than said DC input voltage, said boost DC to DC converter comprising:
  - an inductor for receiving said DC input voltage and a current flowing through said inductor;
  - a controller coupled to said inductor and comprising a capacitor having a voltage capable of emulating said current of said inductor in a continuous current mode and a discontinuous current mode, wherein said controller is capable of generating a first pulse frequency modulation signal and a second pulse frequency modulation signal according to a first comparison between said voltage of said capacitor and a first predetermined level and according to a second comparison between said voltage of said capacitor and a second predetermined level;
  - a high side switch and a low side switch coupled to said inductor, wherein said high side and low side switches are controlled respectively by said first and second pulse frequency modulation signals from said controller, and said high side switch is operable for providing said DC output voltage; and
  - a feedback circuit coupled to said inductor, wherein said feedback circuit selectively senses said DC output voltage or a voltage at a terminal of said at least one switch and generates a feedback signal.

30. The electronic device of claim 29, wherein said controller comprises:
- a current source capable of generating a charge current to charge said capacitor;
- a switchable current sink capable of generating a discharge current to discharge said capacitor, wherein said voltage of said capacitor depends on said charge current and said discharge current;
- a control logic circuit, wherein said control logic circuit is triggered by said voltage of said capacitor and generates a plurality of control signals according to said first comparison and according to said second comparison, and
- a driver, wherein said driver receives said plurality of control signals from said control logic circuit and generates said first pulse frequency modulation signal to control said high side switch and said second pulse frequency modulation signal to control said low side switch.

31. The electronic device of claim 30, wherein said first pulse frequency modulation signal has a first duration, wherein said first duration is determined by said first comparison between said voltage of said capacitor and said first predetermined level, said capacitor is charged by said charge current during said first duration, and said charge current is proportional to said DC input voltage during said first duration.

32. The electronic device of claim 31, wherein said inductor is charged when said high side switch is turned off and said low side switch is turned on during said first duration, wherein a rate of change in current with time of said inductor is proportional to said DC input voltage during said first duration.

33. The electronic device of claim 30, wherein said second pulse frequency modulation signal has a second duration, said second duration is determined by said second comparison between said voltage of said capacitor and said second predetermined level, said capacitor is discharged by a discharge current during said second duration, and said discharge current is proportional to a voltage variance between said DC output voltage and said DC input voltage during said second duration.

34. The electronic device of claim 33, wherein said inductor is discharged when said high side switch is turned on and said low side switch is turned off during said second duration, wherein a rate of change in current with time of said inductor is proportional to said voltage variance between said DC output voltage and said DC input voltage during said second duration.

35. The electronic device of claim 34, wherein said voltage of said capacitor reaches a lowest value after said second duration, said current of said inductor is discharged to zero after said second duration, and said high side switch is turned off after said second duration.

36. The electronic device of claim 35, wherein said voltage of said capacitor emulates said current of said inductor during said second duration.

37. The electronic device of claim 30, wherein said current source comprises:
- a voltage divider, wherein said voltage divider scales down said DC input voltage and generates a scaled-down voltage;
- a voltage follower, wherein said voltage follower receives said scaled-down voltage and generates a first current;
- a plurality of current mirrors, wherein said plurality of current mirrors mirror said first current and generate a second current; and
- a switch coupled to said plurality of current mirrors, wherein said switch sends said second current to charge said capacitor when said switch is turned on.

38. The electronic device of claim 30, wherein said switchable current sink comprises:
- a voltage follower, wherein said voltage follower receives a predetermined voltage and converts said predetermined voltage to a first current;
- a plurality of current mirrors, wherein said plurality of current mirrors receive said first current and generate a plurality of mirrored currents; and
- a multiplex switch coupled to said plurality of current mirrors, wherein said multiplex switch selects one of said mirrored currents and a predetermined current as said discharge current to discharge said capacitor.

39. The electronic device of claim 30, wherein said feedback circuit comprises:
- a double throw switch coupled in parallel with said high side switch;
- a voltage divider coupled to said double throw switch, wherein said voltage divider generates a scaled-down voltage; and
- a comparator coupled to said voltage divider, wherein said comparator receives a reference voltage and said scaled-down voltage and generates said feedback signal, wherein said feedback signal comprises a component of said current of said inductor and triggers said control logic circuit.

40. The electronic device of claim 30, wherein said DC to DC converter further comprises a current sense circuit, wherein said current sense circuit detects said current of said inductor and generates a control signal to said control logic circuit.

* * * * *